Dec. 22, 1936.    H. M. BARBER    2,065,300
DELIVERY MECHANISM FOR PRINTING PRESSES
Filed Nov. 14, 1935    2 Sheets-Sheet 1
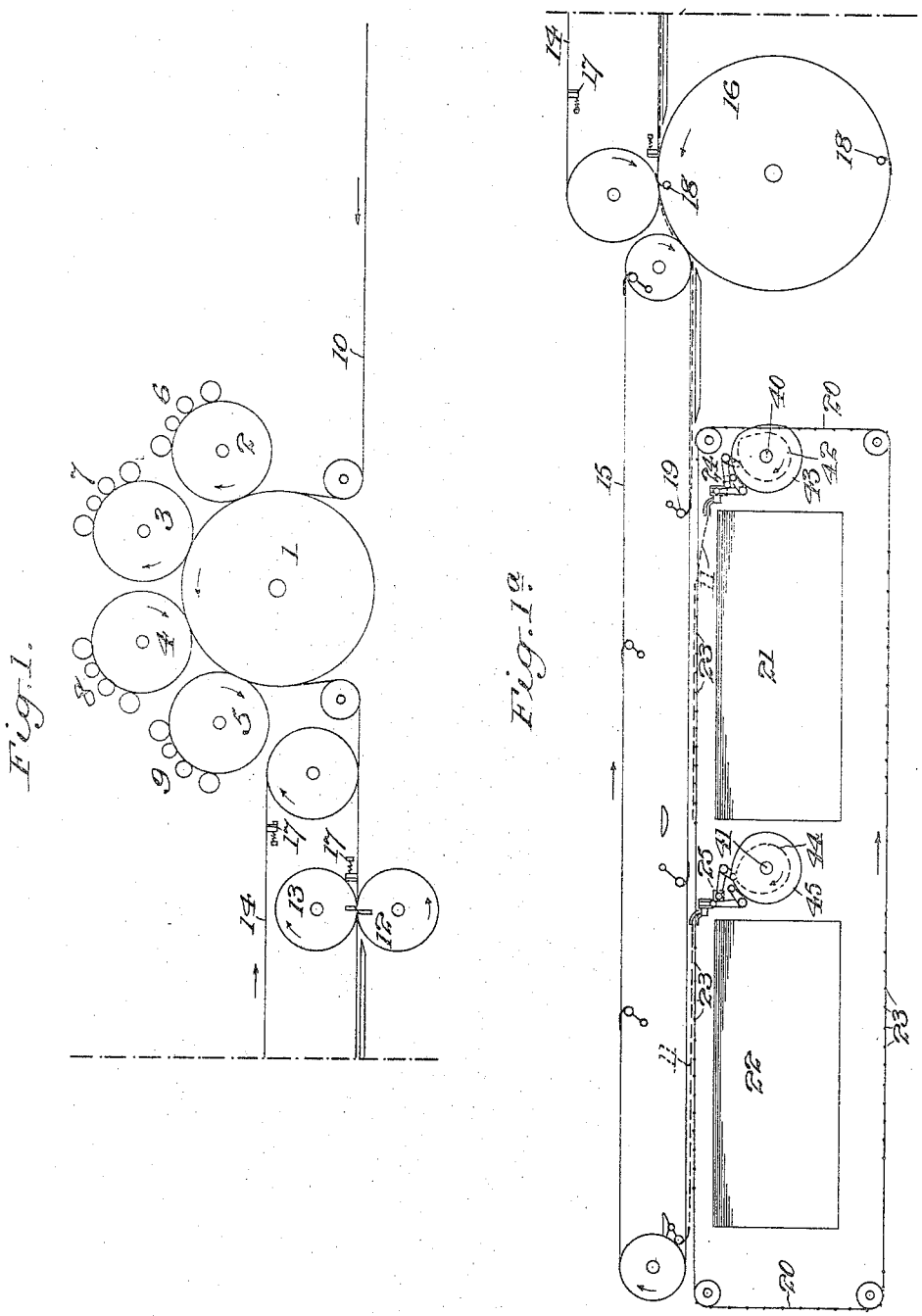
INVENTOR.
Howard M. Barber
BY
ATTORNEYS Dec. 22, 1936.   H. M. BARBER   2,065,300
DELIVERY MECHANISM FOR PRINTING PRESSES
Filed Nov. 14, 1935   2 Sheets-Sheet 2
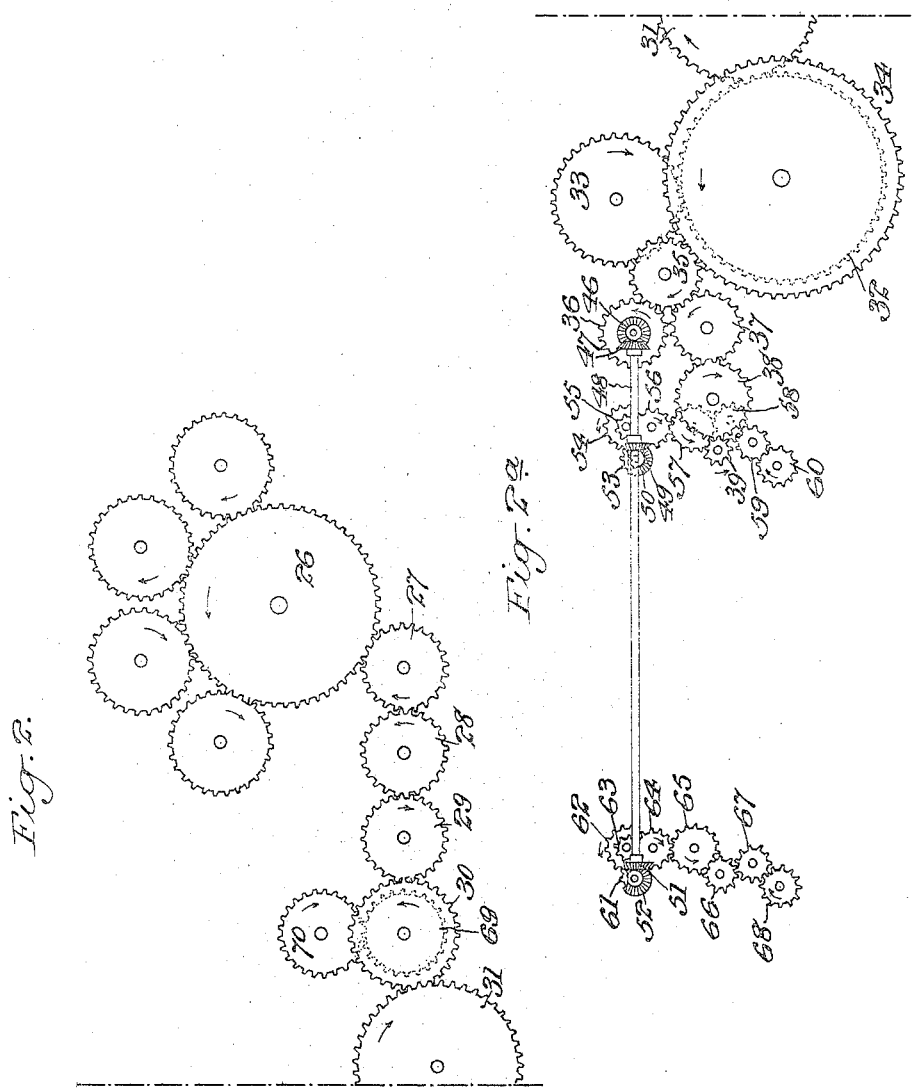
INVENTOR.
Howard M. Barber
BY
ATTORNEYS Patented Dec. 22, 1936

2,065,300

UNITED STATES PATENT OFFICE 2,065,300

DELIVERY MECHANISM FOR PRINTING PRESSES

Howard M. Barber, Pawcatuck, Conn., assignor to C. B. Cottrell & Sons Company, Westerly, R. I., a corporation of Delaware Application November 14, 1935, Serial No. 49,684

14 Claims. (Cl. 271—79)

My invention comprises, generally, an inner traveling endless carrier, an outer traveling endless carrier and a sheet transfer rotary carrier interposed between the inner and outer traveling endless carriers, the inner endless carrier having approximately the surface speed of the press, and both the rotary carrier and the outer endless carrier having a higher surface speed.

My invention further comprises the addition of a traveling endless sheet delivery carrier located beneath the outer traveling endless carrier and having approximately the same surface speed as the outer endless carrier and the rotary sheet transfer carrier.

A practical embodiment of my invention is represented in the accompanying drawings in connection with a two pile flat sheet delivery for a rotary web printing press.

Figs. 1 and 1ᵃ represent in diagram a side elevation of so much of the printing press and delivery as includes my invention.

Figs. 2 and 2ᵃ represent a detail side elevation of the gear trains connecting the several carriers with the press and with the inner and outer sets of sheet tail end engaging devices.

The rotary web printing press is herein shown as arranged to print in four colors on one side of the web, the impression cylinder being denoted by 1, the form cylinders by 2, 3, 4, 5 and their inking mechanisms by 6, 7, 8, 9. The web is denoted by 10 and the sheets cut therefrom by 11. The pair of rotary coacting cutters for severing the sheets from the web are denoted by 12, 13.

The inner horizontally disposed carrier 14 travels in an endless path and it is driven at the surface speed of the press.

The outer horizontally disposed carrier 15 travels in an endless path and it is driven at a surface speed somewhat in excess of the surface speed of the press and of the inner endless carrier.

A rotary sheet transfer carrier 16 is interposed between the outer end of the inner endless carrier 14 and the inner end of the outer endless carrier 15.

Side grippers 17 on the inner endless carrier 14 serve to advance a web through the coacting rotary cutters 12, 13 to the head grippers 18 on the rotary sheet transfer carrier 16, which head grippers 18 in turn transfer the sheets cut from the printed web to the head grippers 19 on the outer endless carrier 15.

A horizontally disposed delivery carrier 20 travels in an endless path around the inner and outer sheet delivery piles 21 and 22, which delivery carrier travels at the surface speed of the outer endless carrier 15 and the rotary transfer carrier 16. This endless delivery carrier 20 is provided with spaced sheet supporting surfaces 23 arranged in the travel of the carrier to pass under the outer endless carrier 15 and over the tops of the sheet delivery piles 21 and 22.

The inner and outer sets of sheet tail end engaging devices, herein shown as tail grippers 24 and 25 are moved and operated to take the sheets from their respective supporting surfaces 23 of the endless delivery carrier 20 and deposit the sheets onto their respective piles. Any well known or approved means may be employed for moving and operating these grippers to grasp and deliver their sheets, such, for instance, as the means shown, described and claimed in my copending application filed of even date herewith, its Serial Number being 49,683.

The gearing which I have shown for operatively connecting the several carriers with the press and with the inner and outer sets of tail grippers is as follows:

The impression cylinder gear 26 drives the inner endless carrier at the surface speed of the press and the rotary transfer carrier, the outer endless carrier and the endless delivery carrier all at a higher surface speed, through the train of gears 27 to 39 inclusive.

The inner and outer shafts 40 and 41 for the cams 42, 43 and 44, 45 which control the movement and operation of the inner and outer sets of tail end grippers 24 and 25 are driven from the shaft of the gear 36 through the pair of bevel gears 46, 47, shaft 48, inner and outer pairs of bevel gears 49, 50 and 51, 52 and inner and outer trains of gears 53 to 60 inclusive and 61 to 68 inclusive.

The coacting rotary cutters 12, 13 may be driven from the shaft of the gear 30 through the gears 69, 70.

It will be understood that the grippers on the inner and outer endless carriers and the rotary carrier are all operated at the proper times to advance and release the sheets by any well known or approved means.

In operation

As the printed web leaves the press it is engaged by successive side grippers 17 on the inner endless carrier 14 and advanced through the rotary cutters 12, 13 which sever the sheets 11 from the web. As the sheets are severed the head grippers 18 on the rotary transfer carrier 16 grasp successive sheets, speed up their travel and transfer them to successive sets of head grippers 19 on the outer endless carrier 15. These head grippers 19 advance the sheets outwardly over the inner and outer piles 21 and 22, the sheets at the same time being supported by successive sheet supporting surfaces 23 of the endless delivery carrier 20, which surfaces travel along with and under the outer endless carrier 15.

The head grippers 19 may then be opened to release the leading ends of their respective sheets as the sheets reach positions over the inner and outer piles 21 and 22 respectively, and the tail ends of the said sheets are taken by the tail end grippers 24 and 25 respectively, and deposited onto the piles.

While I have described a certain arrangement of gearing for connecting the several operating parts it will be understood that any other suitable gear mechanism may be used for this purpose.

It is also evident that various changes may be resorted to in the construction, form and arrangement of the several parts without departing from the spirit and scope of my invention, and hence I do not intend to be limited to the particular embodiment herein shown and described, but

What I claim is:

1. A sheet delivery for printing presses comprising inner and outer traveling endless carriers, an interposed rotary carrier, and means for driving the inner endless carrier at approximately the surface speed of the press, and both the rotary carrier and the outer endless carrier at a higher surface speed.

2. A sheet delivery for printing presses comprising inner and outer traveling endless carriers, an interposed rotary carrier, a traveling endless delivery carrier, and means for driving the inner endless carrier at approximately the surface speed of the press, and the rotary carrier, the outer endless carrier and the endless delivery carrier at a higher surface speed.

3. A sheet delivery for printing presses comprising inner and outer traveling endless carriers, an interposed rotary carrier, a traveling endless delivery carrier located beneath the outer endless carrier, and means for driving the inner endless carrier at approximately the surface speed of the press, and the rotary carrier, the outer endless carrier and the endless delivery carrier at a higher surface speed.

4. A sheet delivery for printing presses comprising inner and outer traveling endless carriers having spaced sheet engaging devices, an interposed rotary carrier having spaced sheet engaging devices, and means for driving the inner endless carrier at approximately the surface speed of the press, and both the rotary carrier and the outer endless carrier at a higher surface speed.

5. A sheet delivery for printing presses comprising inner and outer traveling endless carriers having spaced sheet engaging devices, an interposed rotary carrier having spaced sheet engaging devices, a traveling endless delivery carrier having spaced sheet supporting surfaces, and means for driving the inner endless carrier at approximately the surface speed of the press, and the rotary carrier, the outer endless carrier and the endless delivery carrier at a higher surface speed.

6. A sheet delivery for printing presses comprising inner and outer traveling endless carriers having spaced sheet engaging devices, an interposed rotary carrier having spaced sheet engaging devices, a traveling endless delivery carrier having spaced sheet supporting surfaces and located beneath the outer endless carrier, and means for driving the inner endless carrier at approximately the surface speed of the press, and the rotary carrier, the outer endless carrier and the endless delivery carrier at a higher surface speed.

7. A sheet delivery for printing presses comprising a delivery pile, inner and outer carriers traveling in endless paths, an interposed rotary carrier, a delivery carrier traveling in an endless path around the delivery pile, and means for driving the inner carrier at approximately the surface speed of the press, and the rotary carrier, the outer carrier and the delivery carrier at a higher surface speed.

8. A sheet delivery for printing presses comprising inner and outer delivery piles, inner and outer carriers traveling in endless paths, an interposed rotary carrier, a delivery carrier traveling in an endless path around the delivery piles, and means for driving the inner carrier at approximately the surface speed of the press, and the rotary carrier, the outer carrier and the delivery carrier at a higher surface speed.

9. A sheet delivery for printing presses comprising inner and outer traveling endless carriers, an interposed rotary carrier, a traveling endless delivery carrier, a set of sheet tail end engaging devices for taking the sheets from the endless delivery carrier and delivering them to a predetermined point, and means for driving the inner endless carrier at approximately the surface speed of the press, and the rotary carrier, the outer endless carrier and the endless delivery carrier at a higher surface speed.

10. A sheet delivery for printing presses comprising inner and outer traveling endless carriers, an interposed rotary carrier, a traveling endless delivery carrier, inner and outer sets of sheet tail end engaging devices for taking the sheets from the endless delivery carrier and delivering them to two predetermined points, and means for driving the inner endless delivery carrier at approximately the surface speed of the press, and the rotary carrier, the outer endless carrier and the endless delivery carrier at a higher surface speed.

11. A sheet delivery for printing presses comprising inner and outer traveling endless carriers having spaced sheet engaging devices, an interposed rotary carrier having spaced sheet engaging devices, a traveling endless delivery carrier having spaced sheet supporting surfaces, a set of sheet tail end engaging devices for taking the sheets from the sheet supporting surfaces of the endless delivery carrier and delivering them to a predetermined point, and means for driving the inner endless carrier at approximately the surface speed of the press, and the rotary carrier, the outer endless carrier and the endless delivery carrier at a higher surface speed.

12. A sheet delivery for printing presses comprising inner and outer traveling endless carriers having spaced sheet engaging devices, an interposed rotary carrier having spaced sheet engaging devices, a traveling endless delivery carrier having spaced sheet supporting surfaces inner and outer sets of sheet tail end engaging devices for taking the sheets from their respective sheet supporting surfaces of the endless delivery carrier and delivering them to two predetermined points, and means for driving the inner endless carrier at approximately the surface speed of the press, and the rotary carrier, the outer endless carrier and the endless delivery carrier at a higher surface speed.

13. A sheet delivery for printing presses comprising a delivery pile, inner and outer carriers traveling in endless paths, an interposed rotary carrier, a delivery carrier taveling in an endless path around the delivery pile, a set of sheet tail end engaging devices for taking the sheets from the endless delivery carrier and depositing them on the delivery pile, and means for driving the inner carrier at approximately the surface speed of the press, and the rotary carrier, the outer carrier and the delivery carrier at a higher surface speed.

14. A sheet delivery for printing presses comprising inner and outer delivery piles, inner and outer carriers traveling in endless paths, an interposed rotary carrier, a delivery carrier traveling in an endless path around the delivery piles, inner and outer sets of sheet tail end engaging devices for taking the sheets from the endless delivery carrier and depositing them onto the inner and outer delivery piles, and means for driving the inner carrier at approximately the surface speed of the press, and the rotary carrier, the outer carrier and the delivery carrier at a higher surface speed.

HOWARD M. BARBER.